(12) United States Patent
Gao et al.

(10) Patent No.: US 11,884,291 B2
(45) Date of Patent: Jan. 30, 2024

(54) ASSIGNING VEHICLES FOR TRANSPORTATION SERVICES

(71) Applicant: Waymo LLC, Mountain View, CA (US)

(72) Inventors: Xiang Gao, Mountain View, CA (US); Ajay Joshi, Mountain View, CA (US); Gabriel Wolosin, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 582 days.

(21) Appl. No.: 16/983,594

(22) Filed: Aug. 3, 2020

(65) Prior Publication Data

US 2022/0032947 A1    Feb. 3, 2022

(51) Int. Cl.
| | |
|---|---|
| *G06Q 10/0631* | (2023.01) |
| *B60W 30/18* | (2012.01) |
| *G06Q 50/30* | (2012.01) |
| *B60W 60/00* | (2020.01) |
| *G06Q 10/047* | (2023.01) |
| *G06N 20/00* | (2019.01) |
| *G06N 5/04* | (2023.01) |

(52) U.S. Cl.
CPC .... *B60W 60/001* (2020.02); *B60W 30/18163* (2013.01); *G06N 5/04* (2013.01); *G06N 20/00* (2019.01); *G06Q 10/047* (2013.01); *G06Q 10/06311* (2013.01); *G06Q 10/06315* (2013.01); *G06Q 50/30* (2013.01)

(58) Field of Classification Search
CPC ............... B60W 60/001; B60W 30/18163; G06N 5/04; G06N 20/00; G06Q 10/047; G06Q 10/06311; G06Q 10/06315; G06Q 50/30
See application file for complete search history.

(56) References Cited

U.S. PATENT DOCUMENTS

| | | |
|---|---|---|
| 9,188,985 B1 | 11/2015 | Hobbs et al. |
| 9,557,183 B1 | 1/2017 | Ross et al. |
| 9,805,601 B1 * | 10/2017 | Fields .................. G08G 1/0129 |
| 9,939,284 B2 | 4/2018 | Meuleau |
| 2008/0059015 A1 | 3/2008 | Whittaker et al. |
| 2010/0256835 A1 * | 10/2010 | Mudalige ............... G08G 1/164 701/2 |
| 2011/0060496 A1 * | 3/2011 | Nielsen ............. G06Q 10/0631 701/1 |

(Continued)

FOREIGN PATENT DOCUMENTS

JP    2012083892 A    4/2012

*Primary Examiner* — Peter D Nolan
*Assistant Examiner* — Ashley L Redhead, Jr.
(74) *Attorney, Agent, or Firm* — Botos Churchill IP Law

(57) ABSTRACT

Aspects of the disclosure provide for the determining whether to assign a driver to a trip. For instance, a route for a trip between a pickup location and a destination location for a passenger may be determined. Branch routes for the route may be determined based on one or more lane changes of the route. A probability of following each determined branch route may be determined. A probability of requiring assistance for each determined branch route may be determined. Whether to assign a driver to the trip may be determined based on the probabilities for each determined branch route. A vehicle of a fleet of vehicles may be assigned to the trip based on the determine of whether to assign a driver.

21 Claims, 10 Drawing Sheets

(56) References Cited

U.S. PATENT DOCUMENTS

| | | |
|---|---|---|
| 2011/0224893 A1* | 9/2011 | Scofield ................ G08G 1/052 |
| | | 701/119 |
| 2013/0179057 A1 | 7/2013 | Fisher et al. |
| 2015/0066355 A1 | 3/2015 | Siegel et al. |
| 2015/0142207 A1 | 5/2015 | Flehmig et al. |
| 2015/0345967 A1 | 12/2015 | Meuleau |
| 2016/0025505 A1 | 1/2016 | Oh et al. |
| 2016/0144867 A1 | 5/2016 | Delp et al. |
| 2017/0010613 A1 | 1/2017 | Fukumoto |
| 2017/0192437 A1* | 7/2017 | Bier ..................... G05D 1/0077 |
| 2017/0297569 A1 | 10/2017 | Nilsson et al. |
| 2017/0307391 A1 | 10/2017 | Mason et al. |
| 2018/0004211 A1 | 1/2018 | Grimm et al. |
| 2018/0211218 A1* | 7/2018 | Berdinis .......... G06Q 10/08355 |
| 2019/0011275 A1 | 1/2019 | Whinston et al. |
| 2019/0108753 A1 | 4/2019 | Kaiser et al. |
| 2019/0186936 A1 | 6/2019 | Ebner et al. |
| 2019/0217857 A1 | 7/2019 | Sorin et al. |
| 2020/0173798 A1 | 6/2020 | Koseki et al. |
| 2020/0286309 A1* | 9/2020 | Chellapilla ............ G07C 5/085 |
| 2020/0301419 A1 | 9/2020 | Joseph et al. |
| 2021/0148720 A1* | 5/2021 | Yasui ..................... G08G 1/123 |
| 2022/0013014 A1* | 1/2022 | Xu ..................... G01C 21/3697 |
| 2022/0204026 A1* | 6/2022 | Kim ........................ G05D 1/02 |
| 2022/0266869 A1* | 8/2022 | Ito ..................... B60W 60/0053 |
| 2023/0075153 A1* | 3/2023 | Seki ..................... G06F 9/3001 |

* cited by examiner

ASSIGNING VEHICLES FOR TRANSPORTATION SERVICES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to navigate an autonomous vehicle, a routing system may determine a route from a vehicle's current location to a destination location. A planning system may then use the route to plan a short-term trajectory in order to cause the vehicle to progress along the route. Typical routing approaches may attempt to route a vehicle according to a shortest distance metric or a shortest time traveled, while routing approaches may avoid specific locations, such as highways or toll roads. However, for autonomous vehicles there may be additional considerations to consider, such as how likely the vehicle is to require assistance, how likely the vehicle is to become disengaged (i.e. require a switch from an autonomous driving mode to a manual driving mode), whether the vehicle will need to make lane changes, whether the vehicle will be making unprotected turns at traffic light-controlled intersections, etc.

BRIEF SUMMARY

Aspects of the disclosure provide a method of determining whether to assign a vehicle without a driver to a trip. The method includes determining, by one or more processors, a route for a trip between a pickup location and a destination location for a passenger, the route including one or more lane changes; determining, by the one or more processors, branch routes for the route based on the one or more lane changes; determining, by the one or more processors, a probability of following each determined branch route; determining, by the one or more processors, a probability of requiring assistance for each determined branch route; determining, by the one or more processors, whether to assign a driver to the trip based the probability of requiring assistance for each determined branch route and the probability of following each determined branch route; and assigning, by the one or more processors, a vehicle of a fleet of vehicles based on the determination of whether to assign a driver.

In one example, determining the branch routes includes determining a likelihood of success of completing each of the one or more lane changes. In this example, determining the branch routes is further based on a threshold value. In addition or alternatively, determining each determined likelihood of success includes inputting information about each of the one or more turns into a machine learned model. In another example, determining the branch routes includes routing from the pickup location to the destination location and through a location where a vehicle can miss one of the one or more lane changes. In another example, determining the branch routes includes determining additional branch routes for any of the branch routes that include at least one lane change where the vehicle can miss the at least one lane change. In another example, the method also includes determining a probability of following the route, and wherein determining whether the route requires a driver is further based on the probability of following the route. In this example, determining the probability of following the route includes determining a likelihood of completing a lane change for each of the one or more lane changes. In addition, determining the probability of following the route include multiplying any likelihood of successfully completing a lane change for each of the one or more lane changes together. In another example, determining the probability of following the branch routes includes determining a likelihood of not successfully completing a lane change for at least one of the one or more lane changes. In another example, the method also includes determining a probability of requiring assistance for the route, and wherein determining whether the route requires a driver is further based on the probability of requiring assistance for the route. In this example, determining the probability of requiring assistance includes determining a turn difficulty for each turn along the route. In addition, determining the turn difficulty for each turn along the route includes using a machine learned model. In another example, determining the probability of requiring assistance for each determined branch route includes determining a turn difficulty for each turn along each determined branch route. In this example, determining the turn difficulty for each turn along each determined branch route includes using a machine learned model. In another example, determining the probability of requiring assistance for at least one determined branch route is based on whether the at least one determined branch route includes a blockage preventing a vehicle from reaching the destination location. In another example, the method also includes determining a probability of following the route and determining a probability of requiring assistance for the route. In this example, determining whether to assign a driver includes determining a weighted average of the probability of requiring assistance for the route, the probability of requiring assistance for each determined branch route, the probability of following the route, and the probability of following each determined branch route. In this example, the probability of following the route and the probability of following each determined branch route are weights in the weighted average. In addition or alternatively, determining whether to assign a driver includes comparing the weighted average to a threshold value.

DETAILED DESCRIPTION

Overview

Figure 1:
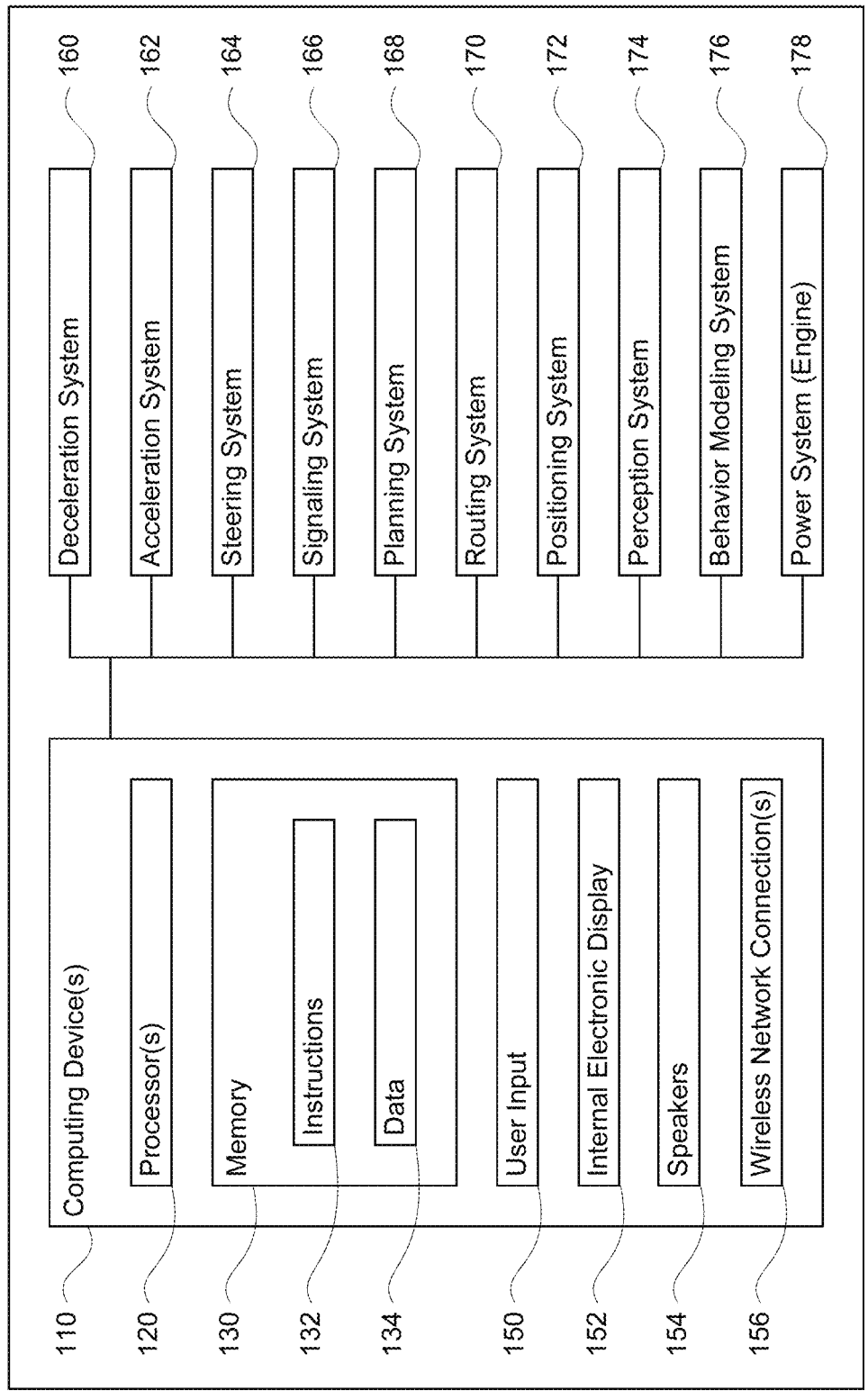
FIG. 1 is a functional diagram of an example vehicle in accordance with an exemplary embodiment.

The technology relates to transportation services involving autonomous vehicles. For example, a routing system may determine a route from a vehicle's current location to a destination location. A planning system may then use the route to plan a short-term trajectory in order to cause the vehicle to progress along the route. Typical routing approaches may attempt to route a vehicle according to a shortest distance metric or a shortest time traveled, while routing approaches may avoid specific locations, such as highways or toll roads. However, for autonomous vehicles there may be additional considerations to consider, such as how likely the vehicle is to require assistance, whether the vehicle will need to make lane changes, etc. At least some of these additional considerations may be modeled and used to select a route. However, in some instances, the likelihood of requiring assistance may be so high that it may be inappropriate to assign an autonomous vehicle without a driver to provide transportation services to a particular passenger.

The computing devices of a vehicle in the autonomous driving mode may require assistance because the vehicle is unable to make forward progress towards its destination. For instance, a vehicle's computing devices may detect a problem that may inhibit forward progress of a vehicle, such as a stationary obstacle blocking a portion of the roadway or low tire pressure which may be caused, for example, due to a slow leak or puncture in a tire of the vehicle. In response, the computing devices may stop the vehicle immediately in a lane or by pulling the vehicle over depending upon the situation. At this point in time, the vehicle would require assistance. As another instance, if the vehicle's computing devices detect a software or hardware issue with any of the features of the autonomous control system, the vehicle may enter a "fallback state" or a mode of degraded operation. In such instances, the vehicle's computing devices may bring the vehicle to a stop again causing the vehicle to require assistance. As another instance, if the computing devices detect input of a particular force at certain user inputs of the vehicle (e.g. brake pedal, accelerator pedal, steering wheel, pullover button, emergency stopping button etc.), devices may stop the vehicle (e.g. pull the vehicle over or stop immediately), causing the vehicle to require assistance. As another instance, the vehicle's computing devices receive instructions from a remote computing device to stop or pull over. For example, in certain circumstances, a human operator may determine that it is no longer safe or practical for a vehicle to continue operating in an autonomous driving mode. This may occur for any number of reasons, such as if the passenger requests assistance (via a user input of the vehicle and/or his or her mobile phone), etc.

To address the aforementioned concerns, when selecting what type of vehicle to assign to passengers for a trip, one or more server computing devices may first estimate a likelihood of an autonomous vehicle requiring assistance. This may involve determining all of the possible "branches" (e.g. missed lane changes) for a route between a pickup location and a drop off location for the passenger. This may be determined using a lane change model that estimates a likelihood of missing a particular lane change. The likelihood of requiring assistance for each of these branches may be determined, for example, using a model for estimating likelihood of requiring assistances. A weighted average of each route branch's likelihood of requiring assistance may then be determined. This weighted average may then be used to determine whether to assign a vehicle without a driver to the passenger for the trip.

The features described herein may be useful in providing transportation services. For example, if the weighted average for a route for a trip indicates that it is highly likely that an autonomous vehicle will require assistance, then it may not be appropriate to assign an autonomous vehicle without a driver to that trip. As a result, by selecting a vehicle with a driver, one that operates manually only or in an autonomous driving mode but still has a safety driver, this may not only improve user experience, but may also reduce the likelihood of autonomous vehicles requiring assistance when those vehicles have passengers.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). For instance, electronic display 152 may be located within a cabin of vehicle 100 and may be used by computing devices 110 to provide information to passengers within the vehicle 100. In addition, the computing devices 110 may include one or more speakers 154 to provide audible information, etc. to passengers of the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The autonomous control system 176 may include various computing devices, configured similarly to computing devices 110, capable of communicating with various components of the vehicle in order to control the vehicle in an autonomous driving mode. For example, returning to FIG. 1, the autonomous control system 176 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, a computing device of the autonomous control system 176 may interact with deceleration system 160 and acceleration system 162 in order to control the speed of the vehicle. Similarly, steering system 164 may be used by autonomous control system 176 in order to control the direction of vehicle 100. For example, if vehicle 100 is configured for use on a road, such as a car or truck, the steering system may include components to control the angle of wheels to turn the vehicle. The autonomous control system 176 may also use the signaling system in order to signal the vehicle's intent to other drivers or vehicles, for example, by lighting turn signals or brake lights when needed.

Routing system 166 may be used by the autonomous control system 176 in order to generate a route to a destination. Planning system 168 may be used by computing device 110 in order to follow the route. In this regard, the planning system 168 and/or routing system 166 may store detailed map information, e.g., highly detailed maps identifying the shape and elevation of roadways, lane lines, intersections, crosswalks, speed limits, traffic signals, buildings, signs, real time traffic information, pullover spots, vegetation, or other such objects and information.

Figure 2:
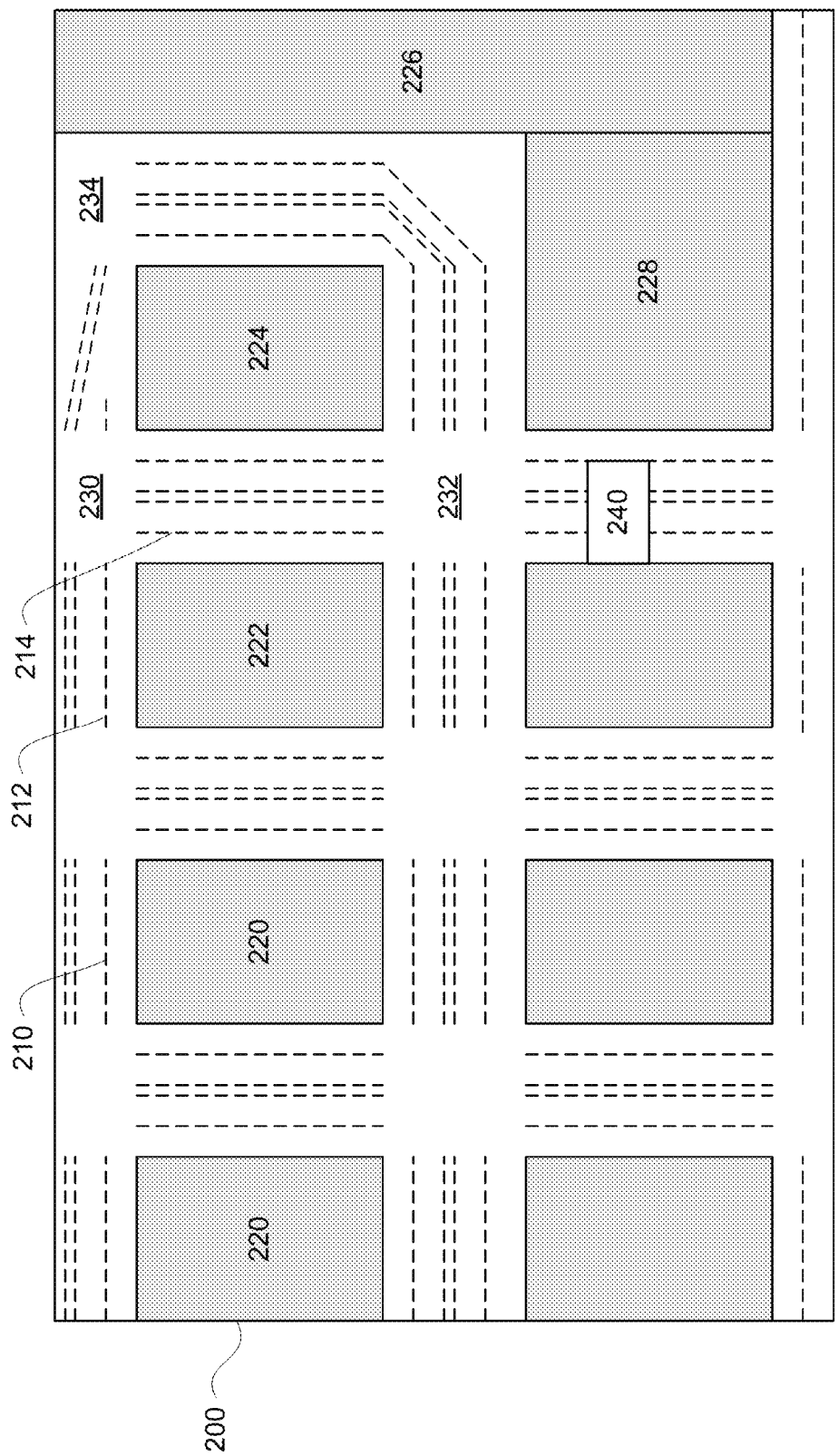
FIG. 2 is an example of map information in accordance with aspects of the disclosure.

FIG. 2 is an example of map information 200 for a section of roadway corresponding to a service area for autonomous vehicles such as vehicle 100. In this example, the map information 200 includes information identifying the shape, location, and other characteristics of lane lines represented by dashed-lines 210, 212, 214 designating roads, lanes or otherwise drivable areas, non-drivable areas (such as buildings, parks, etc.) represented by shaded areas 220, 222, 224, 226, 228 as well as intersections 230, 232, 234. In addition, the map information includes a blockage 240 which may represent a long-term or short-term blockage for any number of reasons such as construction, road closures, etc. Although only few features are depicted in the map information 200 of FIG. 2, the map information 200 may include significantly more features and details in order to enable the vehicle 100 to be controlled in the autonomous driving mode, including for instance the locations and characteristics of traffic control devices, such as stop signs and traffic lights, etc.

Although the map information is depicted herein as an image-based map, the map information need not be entirely image based (for example, raster). For example, the map information may include one or more roadgraphs or graph networks of information such as roads, lanes, intersections, and the connections between these features which may be represented by road segments. In this regard, the map itself may include a plurality of nodes which represent locations through which a vehicle may pass and edges connecting those nodes. The spacing of the nodes may range from a few centimeters to a few meters and may correspond to the speed limit of a road on which the node is located. Greater speeds may correspond to greater distances between nodes. By following the edges and nodes, the vehicle may be routed through the world. Each feature in the map may also be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by autonomous control system 176 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices autonomous control system 176, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
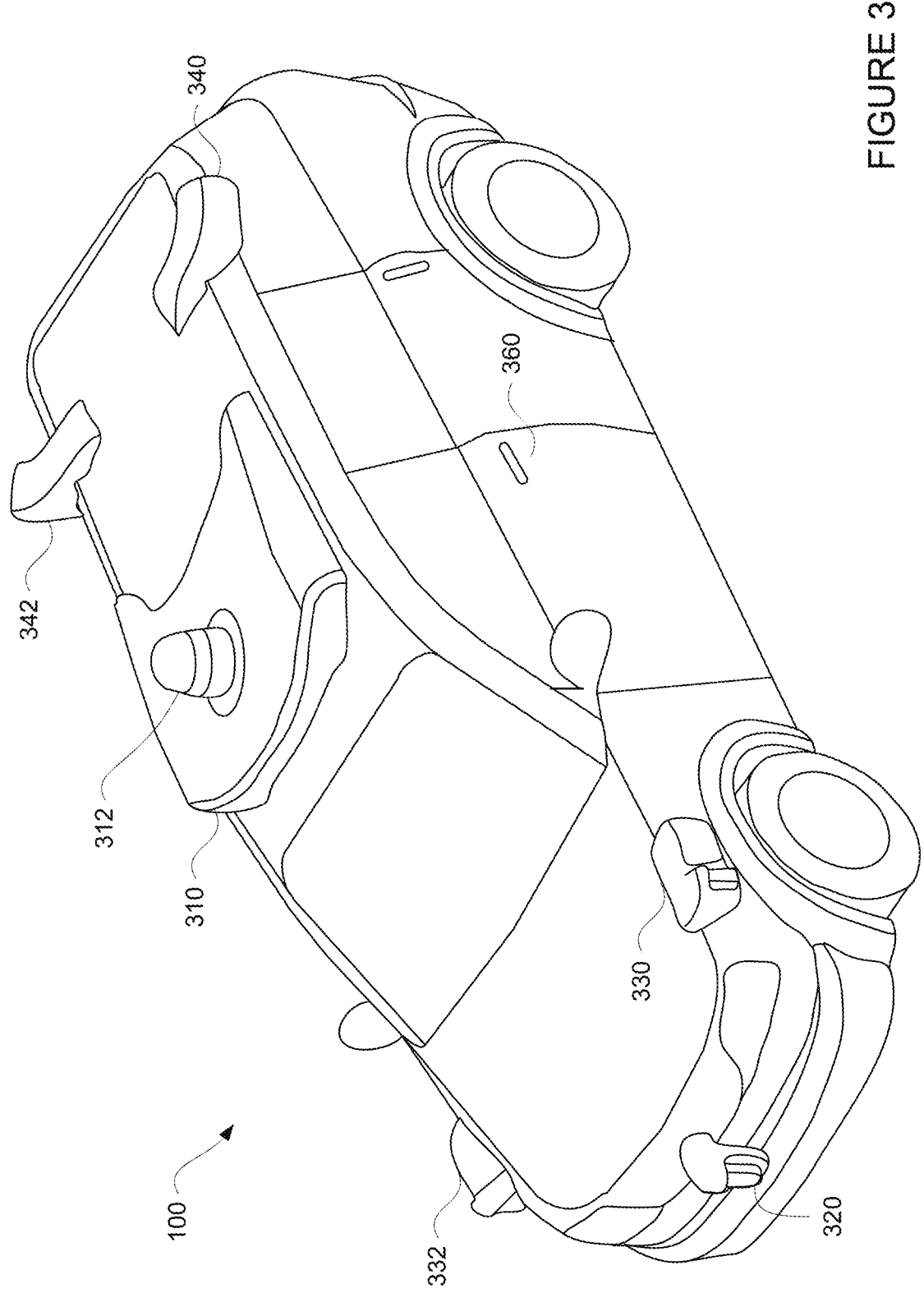
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the autonomous control system 176. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The autonomous control system 176 may be capable of communicating with various components of the vehicle in order to control the movement of vehicle 100 according to primary vehicle control code of memory of the autonomous control system 176. For example, returning to FIG. 1, the autonomous control system 176 may include various computing devices in communication with various systems of vehicle 100, such as deceleration system 160, acceleration system 162, steering system 164, routing system 166, planning system 168, positioning system 170, perception system 172, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a route generated by a routing module of the routing system 166. A control system software module of the autonomous control system 176 may be configured to control movement of the vehicle, for instance by controlling braking, acceleration and steering of the vehicle, in order to follow a trajectory.

The autonomous control system 176 may control the vehicle in an autonomous driving mode by controlling various components. For instance, by way of example, the autonomous control system 176 may navigate the vehicle to a destination location completely autonomously using data from the detailed map information and planning system 168. The autonomous control system 176 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, autonomous control system 176 may also control the drivetrain of the vehicle in order to maneuver the vehicle autonomously.

Figure 4:
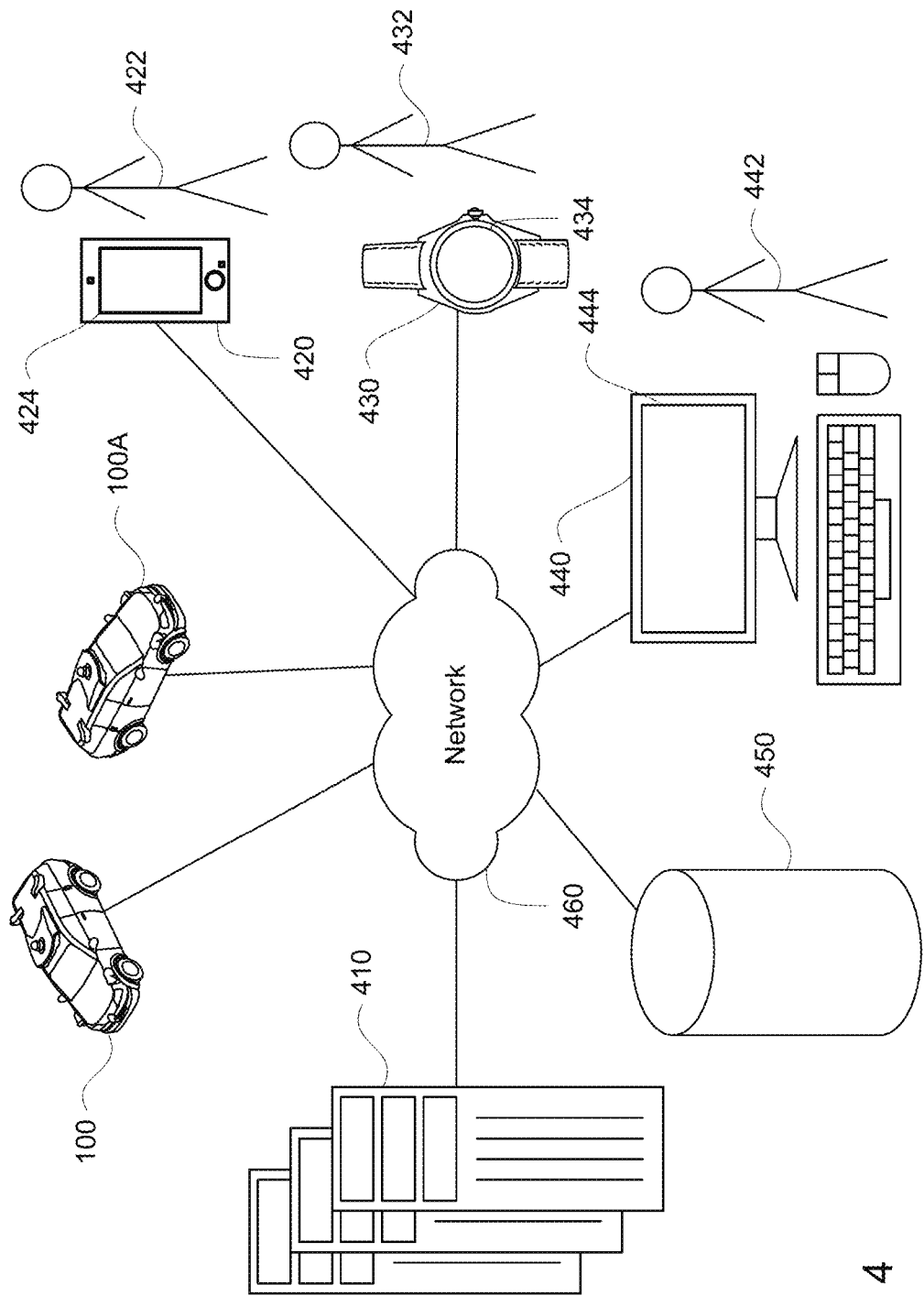
FIG. 4 is a pictorial diagram of an example system in accordance with aspects of the disclosure.
Figure 5:
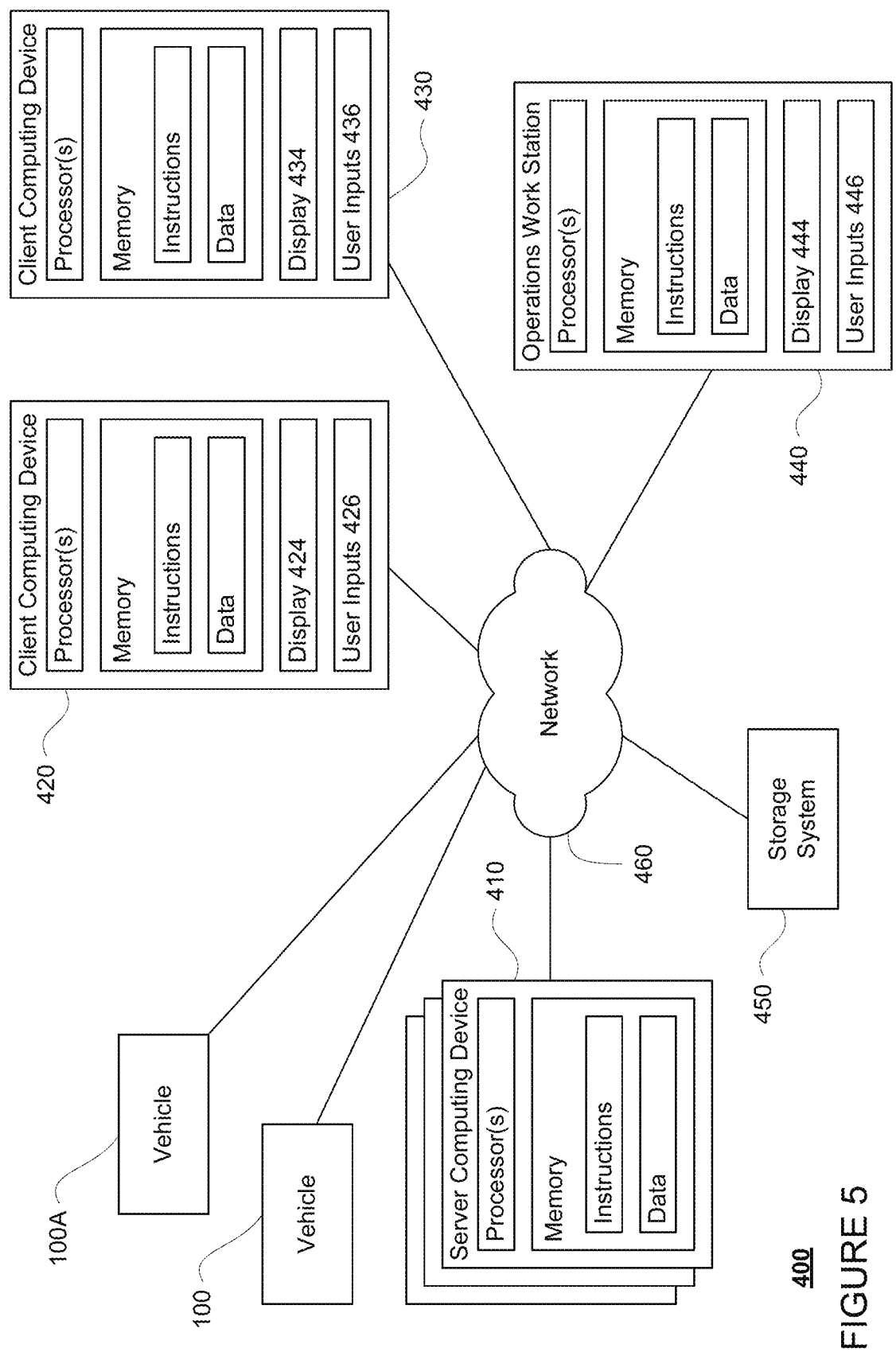
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information. For instance, the storage system 450 may also store the aforementioned autonomous vehicle control software which is to be used by vehicles, such as vehicle 100, to operate a vehicle in an autonomous driving mode. This autonomous vehicle control software stored in the storage system 450 include various invalidated and validated versions of the autonomous vehicle control software. Once validated, the autonomous vehicle control software may be sent, for instance, to memory 130 of vehicle 100 in order to be used by computing devices of the vehicle in order to control the vehicle in an autonomous driving mode.

Storage system 450 may store various types of information as described in more detail below. This information may be retrieved or otherwise accessed by a server computing device, such as one or more server computing devices 410, in order to perform some or all of the features described herein. For instance, the storage system 450 may store the aforementioned map information as well as various models as well as model parameters discussed further below. The storage system 450 may also store log data. This log data may be collected from data generated by a vehicle's various systems. For instance, the log data may be a record of all events that occur while a vehicle is driving in an autonomous driving mode. For example, the log data may include sensor data generated by a perception system, such as the perception system 172 of vehicle 100. As an example, the sensor data may include raw sensor data as well as data identifying defining characteristics of perceived objects (including other road users) such as shape, location, orientation, speed, etc. of objects such as vehicles, pedestrians, bicyclists, vegetation, curbs, lane lines, sidewalks, crosswalks, buildings, etc. In addition, the log data may include information such as locations, routes, trajectories, speeds, accelerations, decelerations, turning behaviors, as well as various messages or annotations generated by the vehicle's various systems as described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to determine where lane changes are likely to be successful and the likelihood of requiring assistance during a turning maneuver, different approaches may be used. As one approach, each possible turn in the map information may be associated with a value indicating how likely a vehicle is to require assistance while executing that turn (i.e. the vehicle is unable to complete the turn). These values may be determined manually, using models, or a combination of both. For example, a human operator could decide that routes through that construction zone should use a vehicle with a driver and thus the construction zone may be associated with a very high likelihood of requiring assistance. This information may be stored, for example, with the map information or elsewhere so it can be accessed by the server computing devices 410 (and or the computing devices 110) as needed.

The model may be a machine learned model trained using at least some log data. For instance, the server computing devices 410 may access the log data of storage system 450 in order to train one or more models as discussed further below.

In the example of a lane change model, the training data may include the log data identifying lane changes. For instance, for each route, the routing system 166 may generate annotations identify locations where the vehicle is expected to make a lane change. The annotations may also identify an expected duration for the lane change, or rather, how long the vehicle is expected to have to complete the lane change. The output of the planning system 168, i.e. the vehicle's trajectories, may then be analyzed to determine whether for each annotation a successful lane change was made or whether the lane change was aborted for some reason. This analysis may provide information such as the speed of the vehicle during the lane change, the acceleration and/or deceleration of the vehicle during the lane change, as well as the time of day information.

The lane change model may then be trained, for instance, using the server computing devices 410. For instance, the training may include using time of day information (see examples above), map information (including lane curvature and distance to a traffic control such as a traffic signal light or a stop sign), the location of the vehicle, the duration of the lane change, as well as a direction of the lane change as training inputs as well as whether or not the lane change was successful or aborted as training outputs.

For instance, the training input may include a list of values corresponding to specific features representative of the circumstances when the vehicle is attempting a lane change maneuver. The values for these features may be determined from the log data. An example of the specific features and corresponding values is included in the table below:

| Feature | Input Value Options |
| --- | --- |
| What is the vehicle's current location? | Latitude and longitude OR other location identifier |
| What is the direction of the lane change? | Left, right |
| What is the length of a corridor of opportunity (along which the vehicle could potentially change lanes and after which the vehicle would have to re-route) for the lane change? | A Real Number Distance OR one of a plurality of predetermined bucketized distances |
| How many intersections between the vehicle's current location and a corridor of opportunity to make the lane change? | 0, 1, 2, 3, . . . |
| How heavy is the traffic? | None, low, medium, high |
| What is the current time of day? | 0, 1, 2, . . . , 23 (Each representative of an hour during the day) |
| What is the current day of the week? | Monday, Tuesday, Wednesday . . . Sunday |

The lane change model may be trained to identify whether a vehicle is likely to be successful when attempting a lane change at a given location. The training may provide model parameter values for the lane change model. The more training data used to train the lane change model and determine the model parameter values, the more accurate the lane change model may be at predicting success of lane changes.

In this regard, the lane change model may identify a value indicating how likely a vehicle, such as vehicle 100, will successfully complete a lane change. As an example, this value may be a discrete value on a scale of 0 to 1. In this example, values closer to zero may indicate that a successful lane change is unlikely, and values closer to zero may indicate that a successful lane change is very likely.

In the example of a turn difficulty model, the greater the likelihood of a disengage (e.g. a driver took control of the vehicle in a semi-autonomous or manual driving mode), the greater the difficulty of a turn. In this regard, the training data may include messages or annotations identifying actual disengages that occurred when a vehicle, such as vehicle 100, was attempting a turning maneuver. This may not be relevant to vehicles which only have an autonomous driving mode. For instance, each time there is a disengage, such events may be identified from the log data as disengages. In some instances, disengages that were initiated by a driver for reasons other than safety or to enable the vehicle to make progress, such as where the driver wanted to take a break, etc., may be ignored.

In other instances, some situations where a vehicle may require assistance may also be considered "disengages". For example, situations in which a vehicle, such as vehicle 100, was stuck or required to wait for more than 1 minute at a turn, may be considered a disengage. This may enable the server computing devices 410 to automatically identify situations in which a vehicle was stuck not proceeding through an intersection and may or may not have been able to complete a turn at an intersection.

The turn difficulty model may then be trained, for instance, using the server computing devices 410. For instance, the training may include using time of day information (see discussion above), map information, and the location of the vehicle for each disengage as training inputs as well as the identified disengages as training outputs. For instance, the training input may include a list of values corresponding to specific features representative of the circumstances when the vehicle is at a given location and attempting a turn. The values for these features may be determined from the log data and/or the map information. An example of the specific features and corresponding values is included in the table below:

| Feature | Input Value Options |
| --- | --- |
| What is the vehicle's current location? | Latitude and longitude OR other location identifier |
| What is the speed limit for the road on which the vehicle is currently traveling? | 10, 15, 20, 25, 30, 35, . . . |
| How many lanes on the road are going in the same direction of traffic as the vehicle? | 1, 2, 3, . . . |
| Is there a median on the road? | True, false |
| Is there a bike lane on the road? | True, false |
| Is there a parking lot adjacent to the road? | True, false |
| Is there a shared turning lane on the road? | True, false |
| Is the vehicle within a predetermined distance (such as 50 meters or more or less) from an intersection? | True, false |
| What is the current time of day? | 0, 1, 2, . . . , 23 (Each representative of an hour during the day) |
| What is the current day of the week? | Monday, Tuesday, Wednesday . . . Sunday |
| What is the direction of the turn? | Left, right, u-turn |
| Is the vehicle making an unprotected turn? | True, false |
| How many lanes of traffic is the vehicle unprotected from? | 0, 1, 2, 3, . . . |
| What is the maximum speed limit of the lanes that the vehicle is unprotected from? | 25, 30, 35, 40, 45, . . . |
| Are there any known static objects (such as buildings or trees) that restrict perception (or visibility)? | True, false |

The turn difficulty model may be trained to identify whether a vehicle is likely to disengage at a given location and when the vehicle is attempting a turn. The turn difficulty model may be trained to identify how difficult a given turn is. The training may provide model parameter values for the turn difficulty model. The more training data used to train the lane change model and determine the model parameter values, the more accurate the turn difficulty model may be at predicting difficulty of turns.

In this regard, the turn difficulty model may identify a value indicating how difficult a turn will be for a vehicle, such as vehicle 100, operating in an autonomous driving mode. As an example, this value may be a discrete value on a scale of 0 to 1. In this example, values closer to zero may indicate a very easy turn (one unlikely to result in a disengage), and values closer to 1 may indicate a more difficult turn (one very likely to result in a disengage).

In some instances, additional annotations may be available and thus used to determine what disengages should be used as training data for the turn difficulty model. For instance, drivers and/or passengers of a vehicle may have the ability to provide annotations, written, visual and/or audible, each time there is a disengage. For example, a driver may indicate that he or she took over because she was uncomfortable with a traffic situation, and thus, the disengage may not be suitable for training purposes. In this regard, some disengages from the log data may be filtered from the training data prior to training the models. As another instance, if a particular disengage was uncomfortable for a driver or passenger, the driver or passenger may provide feedback indicating as such. This feedback may be stored as annotations which indicate how uncomfortable some maneuver was for the user. These can be used to train a model which estimates how uncomfortable a particular disengage was for a passenger. Those disengages which are likely to be most uncomfortable may be used as training data.

The models may then be used by the server computing devices 410. In addition, the one or more of the aforementioned models may then be transmitted or otherwise loaded into the memory of a vehicle and used for routing. For instance, the one or more models may be stored in the memory 130 and/or in memory of the routing system 166. These one or more models may then be used to select a route for a vehicle, such as vehicle 100, having an autonomous driving mode.

Figure 10:
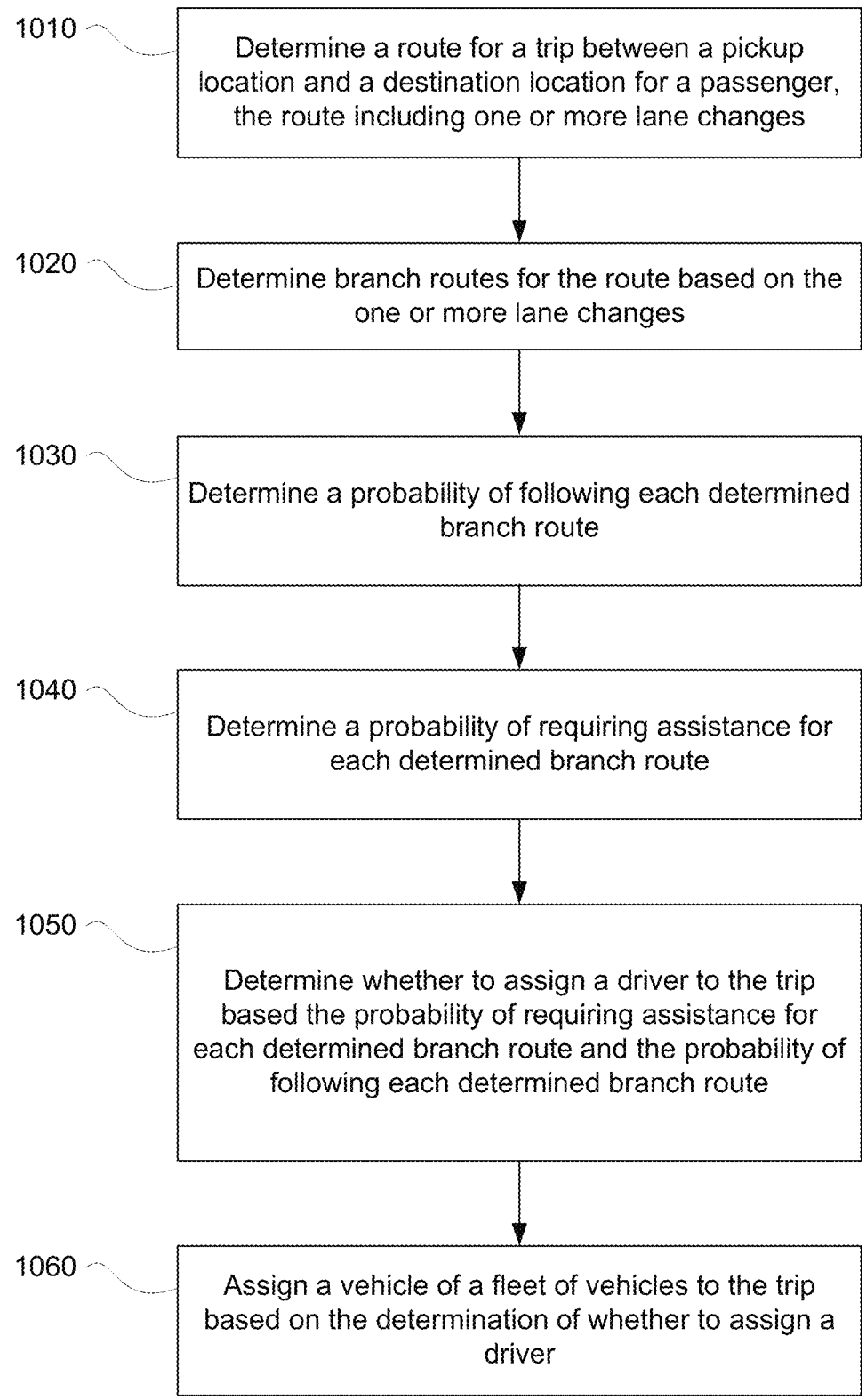
FIG. 10 is an example flow diagram in accordance with aspects of the disclosure.

FIG. 10 is an example flow diagram 1000 of aspects of the disclosure relating to determining whether to assign a vehicle without a driver to a trip which may be performed by one or more processors of a computing device, such as the processors of the server computing device 410. In this example, at block 1010, a route for a trip between a pickup location and a destination location for a passenger is determined. The route includes one or more lane changes. The pickup location may be a pickup location for the passenger, and the destination location may be a drop off location for the passenger. The route may be determined using any known routing technique, such as those that attempt to route a vehicle according to a shortest distance metric or a shortest time traveled, or those that avoid specific locations, maneuvers, etc.

Figure 6:
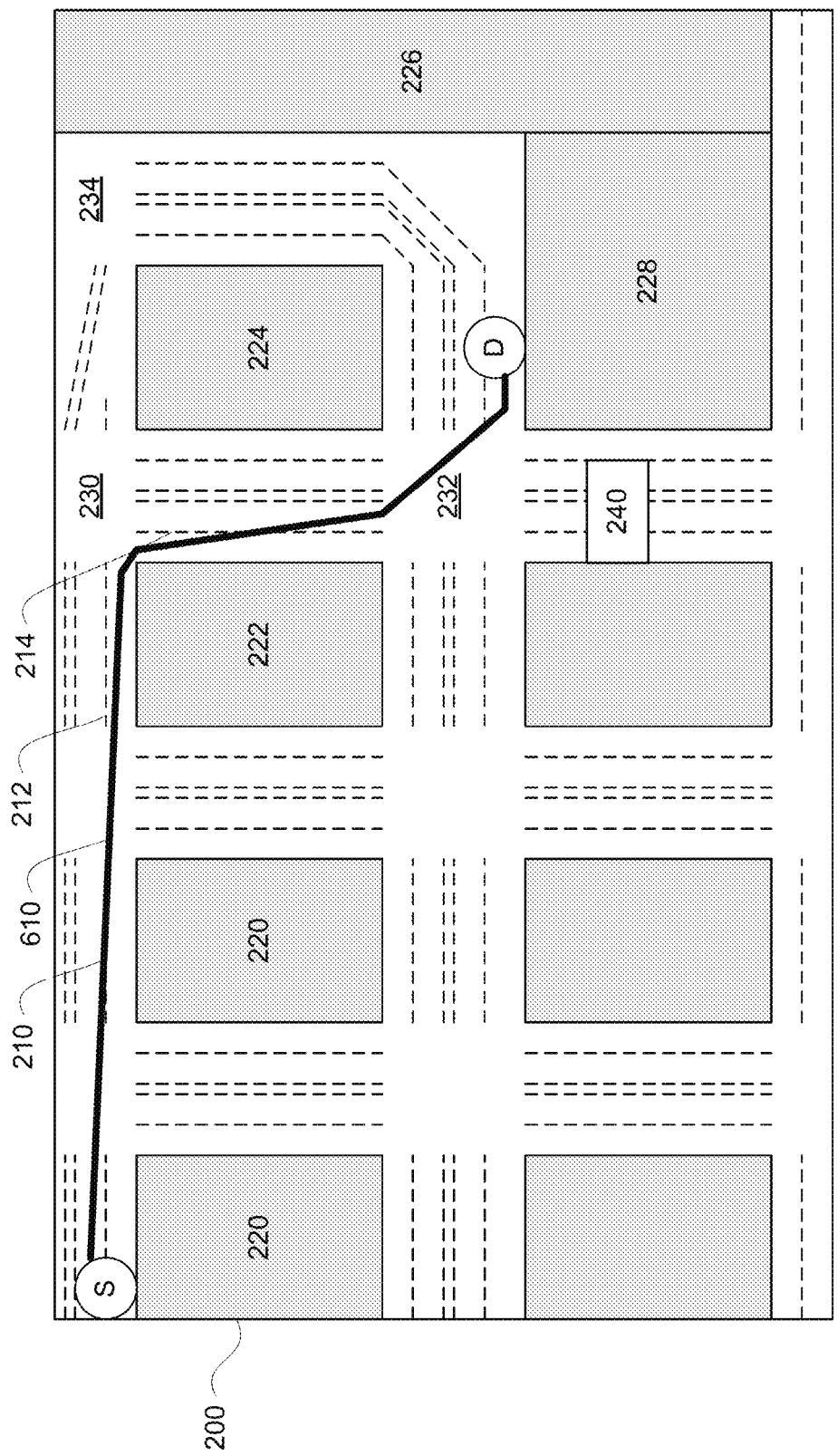
FIG. 6 is an example of map information and a route in accordance with aspects of the disclosure.
Figure 7:
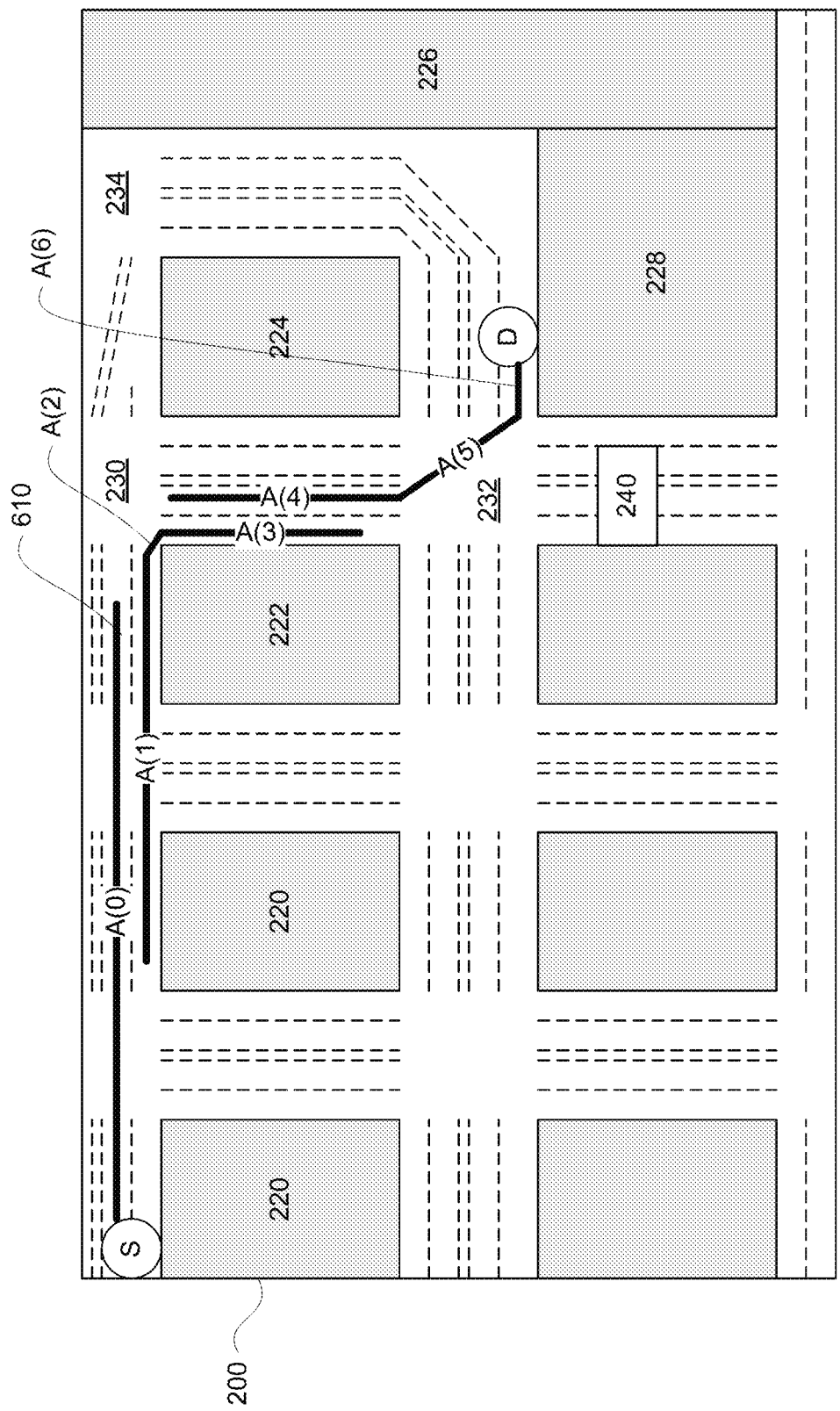
FIG. 7 is an example of map information and a route in accordance with aspects of the disclosure.

FIG. 6 provides an example of a route 610 between a pickup location S (start) and a destination location D (destination). In this example, the route 610 is overlaid on the map information 200 for reference. The route 610 includes two lane changes and two turns. In other words, the route 610 requires the vehicle 100 to cross over lane lines 210 and/or 212, make a right hand turn at intersection 230, cross over lane lines 214, and make a left hand turn at intersection 232. FIG. 7 represents a set of segments for the route 610. In this example, the route 610 includes segments A(0), A(1), A(2), A(3), A(4), A(5), A(6) which the vehicle can use the follow the route 610. Each segment may represent a single edge or a plurality of connected edges in the map information. In this example, Segment A(0) represents where the vehicle can travel between the pickup location S before changing lanes. The adjacent portions of segments A(0) and A(1) represent where the vehicle can change lanes and cross over lane lines 210 or 212. The segment A(2) represents a turn at intersection 230. The adjacent portions of segments A(3) and A(4) represent where the vehicle can change lanes and cross over lane lines 214. The segment A(5) represents a turn at intersection 232. The segment A(6) represents the distance the vehicle must travel between the turn at intersection 232 and the destination D.

At block 1020, branch routes for the route are determined based on the one or more lane changes. This may be determined using a lane change model that estimates a likelihood of successfully completing each lane change of the route. In some instances, the details of the route may include an estimated duration for a lane change. This information may be input into the aforementioned lane change model, in order to determine a likelihood of an autonomous vehicle successfully completing a lane change or rather, whether there is any likelihood of the vehicle 100 missing a lane change. As described above, the lane change model may provide a probability of successfully completing a lane change, for instance on a scale of 0 (not successful) to 1 (successful) or on any other scale.

For example, returning to FIG. 7, the server computing devices 110 may identify all of the lane changes of the route 610. This example includes a lane change between segments A(0) and A(1) and a lane change between segments A(3) and A(4). In this example, the lane change model may determine that the likelihood of success of changing lanes between segments A(0) and A(1) is 0.8 or 80%. Thus, the likelihood of failure would be 0.2 or 20%. In addition, the lane change mode may determine that the likelihood of success of changing lanes between segments A(3) and A(4) is 0.7 or 70%. Thus, the likelihood of failure would be 0.3 or 30%.

For any locations (e.g. all lane change locations) at which a vehicle is likely to miss a lane change along a route, a branch route may be identified. The branch route may be a route which takes the vehicle from the pickup location to the destination but without including a particular lane change with the vehicle is likely to miss. A branch route to a destination may be identified, for example, by determining a new route between a location where the vehicle is likely to miss a lane change and the destination using any known routing technique. The branch route may start from the pickup location, continue to the location at which the vehicle is likely to miss the lane change, and include the new route.

A vehicle may be considered likely to miss a lane change if the likelihood of failure for the lane change multiplied by the probability of reaching the segment before the lane change is greater than a threshold value. As an example, this threshold value may be 0.02 or 2% or more or less. In this regard, if the likelihood of reaching a segment before a lane change multiplied by one minus the output of the model is less than the threshold. In other words, the likelihood of actually missing that lane change becomes so small that determining an additional branch route is considered unnecessary.

Figure 8:
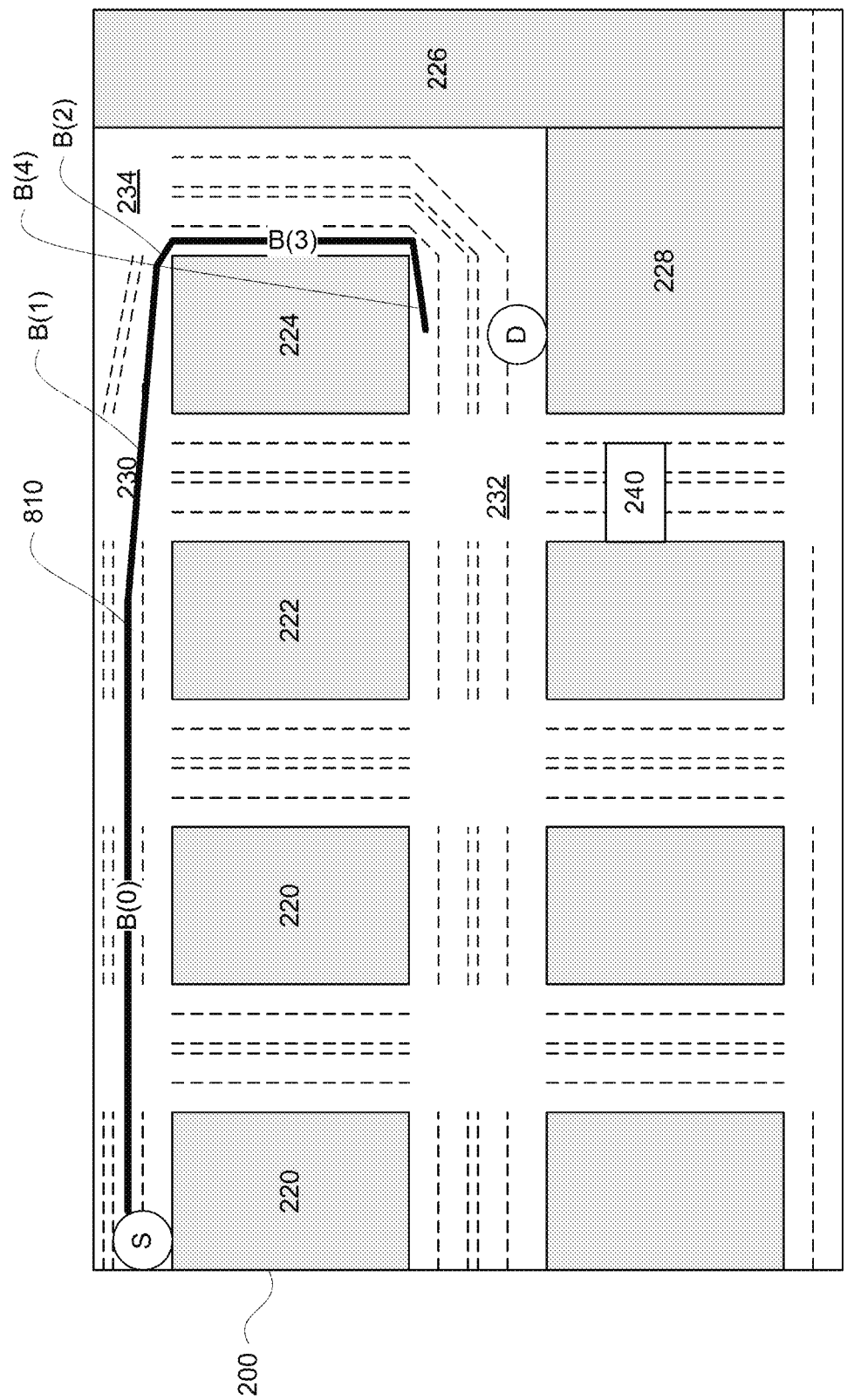
FIG. 8 is an example of map information and a branch route in accordance with aspects of the disclosure.

For example, FIG. 8, represents a branch route 810 including a set of segments B(0), B(1), B(2), B(3), B(4). Each segment may represent a single edge or a plurality of connected edges in the map information. Segment B(0) is the same as segment A(0), but segment B(1) is the segment which the vehicle would follow if the vehicle missed the lane change between segments A(0) and A(1). In this example, segment B(2) represents a turn at intersection 234. Segments B(3) and B(4) would take the vehicle "around the block" and back to the destination location D without involving lane changes or turns.

Figure 9:
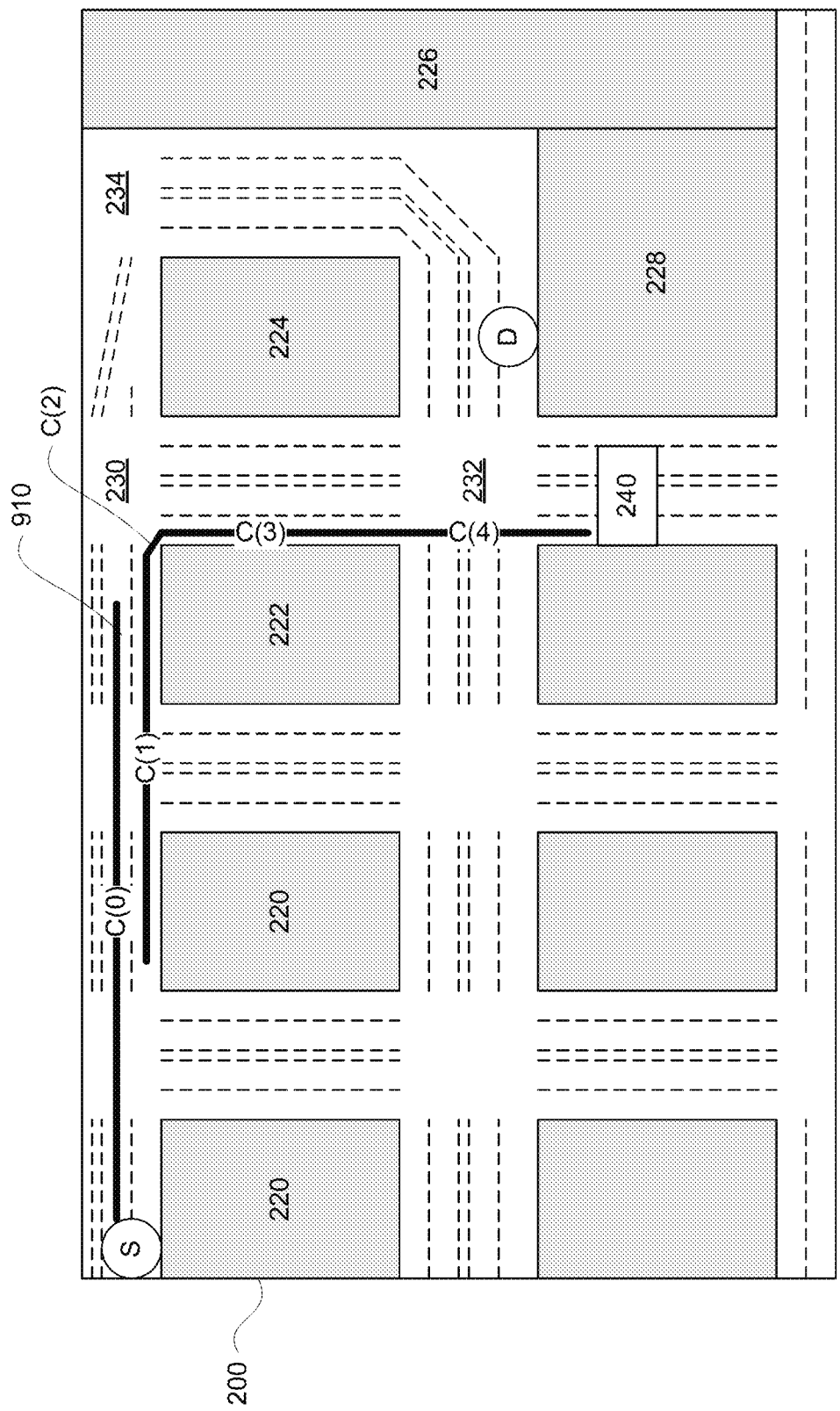
FIG. 9 is an example of map information and a branch route in accordance with aspects of the disclosure.

In some instances, some branches may not be able to reach the destination. For example, FIG. 9, represents a branch route 910 including a set of segments C(0), C(1), C(2), C(3), C(4). Each segment may represent a single edge or a plurality of connected edges in the map information. Segments C(0), C(1), C(2), C(3) is the same as segment A(0), A(1), A(2), A(3), respectively, but segment C(4) is the segment which the vehicle would follow if the vehicle missed the lane change between segments A(3) and A(4). In this example, segment C(4) takes the vehicle to the blockage 240 and thus, the vehicle 100 would not be able to reach the destination.

If either of the branch routes 810, 910 had included lane changes, for any locations at which the vehicle is likely to miss a lane change along the branch route, additional branch routes may be identified. For simplicity, additional branch routes are not included in the examples of FIGS. 6-9.

At block 1030, a probability of following each determined branch route may be determined. This may be determined, for example, by multiplying the likelihood of succeeding for each lane change along the route and along each branch of the route. For example, to follow the route 610, the vehicle 100 must successfully change lanes between segments A(0) and A(1) and between segments A(3) and A(4), so the probability P(A) of following route 610 may be determined by multiplying the likelihood of successfully completing each of these lanes changes or:

$$P(A)=L(A0,A1)*L(A3,A4)=0.8*0.7=0.56 \text{ or } 56\%.$$

In this example, L(A0,A1) is the likelihood of successfully completing the lane change between segments A(0) and A(1), and L(A3,A4) is the likelihood of successfully completing the lane change between segments A(3) and A(4).

To follow the branch route 810, the vehicle 100 must not successfully change lanes between segments A(0) and A(1), so the probability P(B) of following branch route 810 may be determined by the likelihood of failure:

$$P(B)=1-L(A0,A1)=1-0.8=0.2 \text{ or } 20\%.$$

In this example, L(A0,A1) is the likelihood of successfully completing the lane change between segments A(0) and A(1), and 1−L(A0,A1) is the likelihood of not successfully completing the lane change between segments A(0) and A(1). If there were other lane changes on the branch route 810, this value would be multiplied by the likelihood of success of those other lane changes as determined by the lane change model.

To follow the branch route 910, the vehicle 100 must successfully change lanes between segments A(0) and A(1) (L(A(0),A(1)) and not successfully change lanes between segments A(3) and A(4) (L(A(3),A(4)), so the probability P(C) of successfully following branch route 910 may be determined by:

$$P(C)=L(A0,A1)*(1-L(A0,A(2))=0.8*(1-0.3)=0.24 \text{ or } 24\%.$$

In this example, L(A0,A1) is the likelihood of successfully completing the lane change between segments A(0) and A(1), L(A3,A4) is the likelihood of successfully completing the lane change between segments A(3) and A(4), and 1−L(A3,A4) is the likelihood of not successfully completing the lane change between segments A(3) and A(4). If there were other lane changes on the branch route 810, this value would be multiplied by the likelihood of success of those other lane changes as determined by the lane change model.

At block 1040, a probability of requiring assistance for each determined branch route may be determined. This may be determined, for instance, by considering whether a vehicle will require assistance due to difficult turns as well as due to route changes. To do so, subportions of the route and branch routes may be analyzed. For example, these subportions may be defined by each edge of the map information along the route. At least some of these edges may include lane changes or turns. Returning to the examples of FIGS. 6-9, segments A(0)-A(5), B(0)-B(4), C(0)-C(4) represent such subportions. In other examples, the subportions may correspond to individual edges in the map information. Thus, edges can be analyzed individually or as a group if connected to one another. For example, the edges of segment A(1) may be considered individually or as a group. For the purposes of simplicity, these edges are considered as a group in the examples herein.

For each subportion (or segment) i of a route or branch route R, a probability of requiring assistance S may be defined as S[R(i)]. If the subportion includes a turn, S[R(i)] may be the turn difficulty for turn at the subportion i. The turn difficulty may be determined using aforementioned turn difficulty model. For instance, a plurality of values representative of the current circumstances may be input into the turn difficulty model in order to determine a turn difficulty for the subportion i. If the subportion i, of a branch route (again, R) is after failed lane change which results in a vehicle requiring assistance, S[R(i)] would equal 1. If there is no turn along the subportion i and the subportion i is not after a failed lane change, S[R(i)] would be 0.

Assuming the initial subportion for each route or branch route starts as "0", the probability of requiring assistance from the start of the route or branch route to the subportion i may be defined as: S[R(0:i)]=S[R(0:i−1)]+(1−S[R(0:i−1)])*S[R(i)]). So, the probability of requiring assistance of each route or branch route would be S[R]=S[R(0:n)], where n is the number of subportions in the route or branch route.

Returning to the example of route 610, there are two turns at segments A(2) and segment A(5). For each of these turns, a plurality of values representative of the current circumstances may be input into the turn difficulty model in order to determine a turn difficulty. As an example, the turn difficulty for segment A(2) or S[A2] may be 0.01, and the turn difficulty for segment A(5) or S[A] may be 0.03. As such, the likelihood of requiring assistance on route 610 or S[A] may be:

$$S[A]=1-(1-S[A2])*(1-S[A5])=1-0.99*0.97=0.0397 \text{ or } 3.97\%.$$

For the branch route 810, there is one turn at segment B(2). For this turn, a plurality of values representative of the current circumstances may be input into the turn difficulty model in order to determine a turn difficulty. As an example, the turn difficulty for segment B(2) or S[B2] may be 0.02. As such, the likelihood of requiring assistance on branch route 810 or S[B] may be:

$$S[B]=1-(1-S[B2])=0.02 \text{ or } 2\%.$$

For branch route 910, because the route will end at blockage 240, the likelihood of requiring assistance on branch route 910 or S[C] may be: S[C]=1.0 or 100%.

At block 1050, whether to assign a driver to the trip is determined based the probability of requiring assistance for each determined branch route and the probability of following each determined branch route. For instance, the probability of requiring assistance for the route and the probabilities of requiring assistance for the branch routes may be combined as a weighted average. The weights may correspond to the probability of following the route and the probabilities of requiring assistance on each branch route.

For example, the probabilities of requiring assistance for the route 610 and branch routes 810, 910 or S[A], S[B], S[C] respectively may be multiplied by each of the probabilities of following each of these routes or P(A), P(B), P(C), respectively. In this regard, the estimated likelihood of a vehicle requiring assistance when following route 610 or ES may be:

$$ES=P(A)*S(A)+P(B)*S(B)+P(C)*S(C)$$

$$ES=0.56*0.0397+0.2*0.02+0.24*1.0=0.266232 \text{ or } 26.6\%.$$

The weighted average may then be compared to a threshold value in order to determine whether the route requires a vehicle with a driver. This threshold value may be hand-tuned and may be adjusted based upon the number of autonomous vehicles with and without drivers which are currently available to be assigned to a trip.

At block 1060, a vehicle of a fleet of vehicles is assigned to the trip based on the determination of whether to assign a driver. The actual vehicle assigned may be selected based on current availability of vehicles with or without drivers, locations of the vehicle of the fleet, and the aforementioned comparison. For example, all or a portion of the vehicles of the fleet may be like vehicle 100, or capable of driving autonomously, but at any given point in time, only some of these vehicles may have a driver who is capable of taking control of the vehicle in the event of the vehicle requiring assistance. If the weighted average is greater than or equal to the threshold value, for instance, if ES is greater than the threshold value, then a vehicle with a driver may be assigned. If the weighted average does not meet the threshold, for instance, if ES is greater than or equal to the threshold, then a vehicle without a driver may be assigned. For example, if the threshold value is 20%, then a vehicle without a driver may be assigned to a trip with route 610. If the threshold value is 30%, then a vehicle with a driver may be assigned to a trip with route 610.

In some instances, if the comparison indicates that a vehicle with a driver should be used, but one is currently unavailable, the one or more server computing devices may determine that the trip should not be serviced or taken. In such a case, the one or more server computing devices may send a notification to a client computing device associated with the passenger of the trip that the trip cannot be provided (e.g. decline the trip). Alternatively, if the comparison indicates that a vehicle with a driver should be used, but one is currently unavailable, the one or more server computing devices may request that a vehicle from a third-party transportation provider (e.g. a typical taxi driving service) provide the trip.

The assigned vehicle may then be dispatched to pick up a passenger at the pickup location S in order to transport the passenger to the destination location D. The dispatching instructions may include the pickup location, the destination location, as well as the route.

In some instances, routes with greater estimated likelihoods of a vehicle requiring assistance may be used to direct roadside assistance efforts. For example, roadside assistance vehicles can be dispatched to locations along or near such routes (or trips) in case of vehicles requiring assistance. For instance, where there is one or more routes within a given service area with a higher likelihood of a vehicle requiring assistance, for instance, that is due to likely missed lane changes or a blockage, a very precise location of where a vehicle is likely to require assistance (if it happens) is predictable. In this regard, roadside assistance vehicles can be dispatched to locations that are closest to or to a parking area closest to the location where a vehicle is likely to require assistance. If there are multiple routes that have higher likelihoods of a vehicle requiring assistance, roadside assistance vehicles can be dispatched to minimize the time required to reach each of these locations where a vehicle is likely to require assistance on these routes, to minimize the average time to each location where a vehicle is likely to require assistance, or according to some other metric or criteria. For example, roadside assistance vehicles may be positioned for the "worst case scenario" as if all routes or trips are going to result in vehicles requiring assistance, as if an average or 50% of such routes or trips are going to result in vehicles requiring assistance, as if a fixed percentile (e.g. the 50th, 70th, 90th, etc.) percentile of likelihoods for such routes or trips are going to result in vehicles requiring assistance. These values (e.g. percentiles) may be determined based upon the business goals and resources (e.g. the number of roadside assistance vehicles) for the transportation service.

The number and locations of routes where a vehicle is likely to require assistance can also be used as a metric to determine how many roadside assistance vehicles are necessary to ensure that that roadside assistance can be provided to any of the routes with a higher likelihood of requiring assistance within a specified time threshold. For example, this threshold may require that a roadside assistance vehicle can reach a vehicle that requires assistance in less than 3 minutes (or more or less). In addition, besides the location of where a vehicle is likely to require assistance, the time that a vehicle may require assistance (i.e. roughly when a vehicle will reach a location along a route where the vehicle is likely to require assistance) may also be approximated. For instance, for a 30 minute trip, if the predicted time of a vehicle requiring assistance is at 25 minutes into the trip, a roadside assistance vehicle can be dispatched to the location a little bit later if the time for the roadside assistance car to reach the location where the vehicle is likely to require assistance is less than 25 minutes into the trip or rather 25 minutes from when the trip starts.

Although in the examples above, the server computing devices 410 are tasked with determining a route, determining a probability of a vehicle requiring assistance, and determining whether the route requires a vehicle with a driver based on the probability of requiring assistance, alternatively, all or some of these determinations may be made locally at a vehicle such as vehicle 100. For example, the server computing devices 410 may send a request, for instance via network 460, to vehicle 100 which may not have a driver. The request may include a pickup location and a destination location. In such instances, the computing devices 110 may determine a route and may determine a probability of requiring assistance. This information may be sent back to the server computing devices 410, for instance via network 460. If the probability of requiring assistance is too high, or rather, greater than the threshold value, the server computing devices 410 may assign a vehicle with a driver to the trip as in any of the examples described above.

The features described herein may be useful in providing transportation services. For example, if the weighted average for a route for a trip indicates that it is highly likely that an autonomous vehicle will require assistance, then it may not be appropriate to assign an autonomous vehicle without a driver to that trip. As a result, by selecting a vehicle with a driver, one that operates manually only or in an autonomous driving mode but still has a safety driver, this may not only improve user experience, but may also reduce the likelihood of autonomous vehicles requiring assistance when those vehicles have passengers.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of causing an autonomous vehicle to perform a trip, the method comprising:
    determining, by one or more processors, a route for a trip between a pickup location and a destination location for a passenger, the route including one or more lane changes;
    determining, by the one or more processors, a plurality of branch routes to the destination location from a location of the one or more lane changes;
    determining, by the one or more processors, a probability of following least one determined branch route of the plurality of branch routes;
    determining, by the one or more processors, a probability of requiring assistance for the at least one determined branch route of the plurality of branch routes using a machine learned model;
    determining, by the one or more processors, whether to assign a driver to the trip based on the probability of requiring assistance for the at least one determined branch route of the plurality of branch routes and the probability of following the at least one determined branch route of the plurality of branch routes; and
    causing, by the one or more processors, the autonomous vehicle to perform the trip based on the determination of whether to assign a driver.

2. The method of claim 1, wherein determining the plurality of branch routes includes determining a likelihood of success of completing each of the one or more lane changes.

3. The method of claim 2, wherein determining the plurality of branch routes is further based on a threshold value.

4. The method of claim 2, wherein determining each determined likelihood of success includes inputting information about each of the one or more turns into the machine learned model.

5. The method of claim 1, wherein determining the plurality of branch routes includes routing from the pickup location to the destination location and through a location where a vehicle can miss one of the one or more lane changes.

6. The method of claim 1, wherein determining the plurality of branch routes includes determining additional branch routes for any of the branch routes that include at least one lane change where the autonomous vehicle can miss the at least one lane change.

7. The method of claim 1, further comprising, determining a probability of following the route, and wherein determining whether the route requires a driver is further based on the probability of following the route.

8. The method of claim 7, wherein determining the probability of following the route includes determining a likelihood of completing a lane change for each of the one or more lane changes.

9. The method of claim 8, wherein determining the probability of following the route include multiplying any likelihood of successfully completing a lane change for each of the one or more lane changes together.

10. The method of claim 1, wherein determining the probability of following the plurality of branch routes includes determining a likelihood of not successfully completing a lane change for at least one of the one or more lane changes.

11. The method of claim 1, further comprising determining a probability of requiring assistance for the route, and wherein determining whether the route requires a driver is further based on the probability of requiring assistance for the route.

12. The method of claim 11, wherein determining the probability of requiring assistance includes determining a turn difficulty for each turn along the route.

13. The method of claim 12, wherein determining the turn difficulty for each turn along the route includes using a machine learned model.

14. The method of claim 1, wherein determining the probability of requiring assistance for each determined branch route of the plurality of branch routes to the destination location includes determining a turn difficulty for each turn along each determined branch route of the plurality of branch routes.

15. The method of claim 14, wherein determining the turn difficulty for each turn along each determined branch route of the plurality of branch routes to the destination location includes using a machine learned model.

16. The method of claim 1, wherein determining the probability of requiring assistance for at least one determined branch route of the plurality of branch routes to the destination location is based on whether the at least one determined branch route of the plurality of branch routes includes a blockage preventing a vehicle from reaching the destination location.

17. The method of claim 1, further includes:
    determining a probability of following the route;
    determining a probability of requiring assistance for the route; and
    wherein determining whether to assign a driver includes determining a weighted average of the probability of requiring assistance for the route, the probability of requiring assistance for each determined branch route of the plurality of branch routes to the destination location, the probability of following the route, and the probability of following each determined branch route of the plurality of branch routes.

18. The method of claim 17, wherein the probability of following the route and the probability of following each determined branch route of the plurality of branch routes are weights in the weighted average.

19. The method of claim 17, wherein determining whether to assign a driver includes comparing the weighted average to a threshold value.

20. The method of claim 1, wherein information about each of the one or more lane changes comprises at least one of: vehicle's current location, direction of lane change, length of a corridor of opportunity, number of intersections between vehicle's current location and corridor of opportunity, heaviness of traffic, time of day, or day of week.

21. A dispatching server computing system that is configured to implement a method comprising:

determining, by one or more processors, a route for a trip between a pickup location and a destination location for a passenger, the route including one or more lane changes;

determining, by the one or more processors, a plurality of branch routes to the destination location from a location of the one or more lane changes;

determining, by the one or more processors, a probability of following at least one determined branch route of the plurality of branch routes;

determining, by the one or more processors, a probability of requiring assistance for the at least one determined branch route of the plurality of branch routes using a machine learned model;

determining, by the one or more processors, whether to assign a driver to the trip based on the probability of requiring assistance for the at least one determined branch route of the plurality of branch routes and the probability of following the at least one determined branch route of the plurality of branch routes; and causing, by the one or more processors, an autonomous vehicle to perform the trip based on the determination of whether to assign a driver.

* * * * *

UNITED STATES PATENT AND TRADEMARK OFFICE
CERTIFICATE OF CORRECTION

PATENT NO. : 11,884,291 B2
APPLICATION NO. : 16/983594
DATED : January 30, 2024
INVENTOR(S) : Xiang Gao, Ajay Joshi and Gabriel Wolosin Page 1 of 1

It is certified that error appears in the above-identified patent and that said Letters Patent is hereby corrected as shown below:

In the Claims

Claim 1, Column 19, Line 40:
Now reads: "following least one determined branch" should read -- following at least one determined branch --

Signed and Sealed this
Fifth Day of March, 2024

Katherine Kelly Vidal
*Director of the United States Patent and Trademark Office*